April 19, 1932.   A. RUBIN   1,854,227
ATTACHMENT FOR FOOD CHOPPERS
Filed May 2, 1930
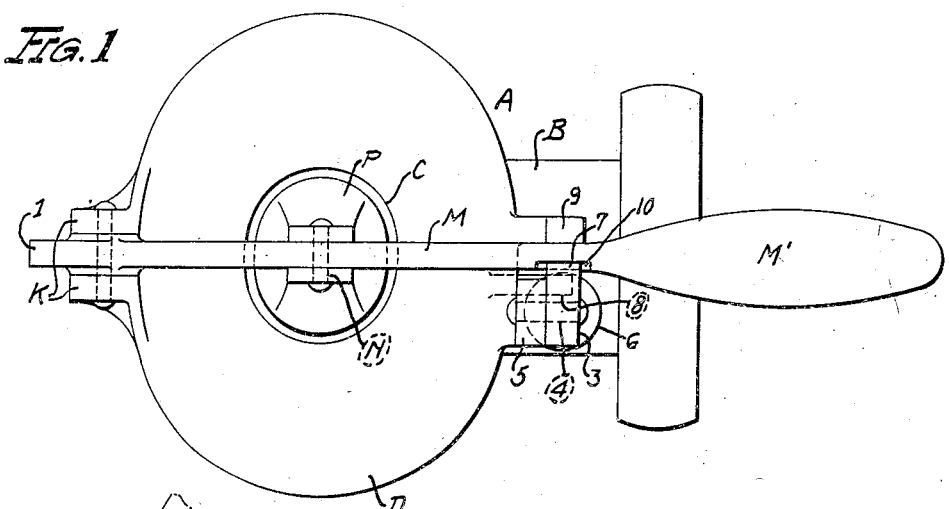
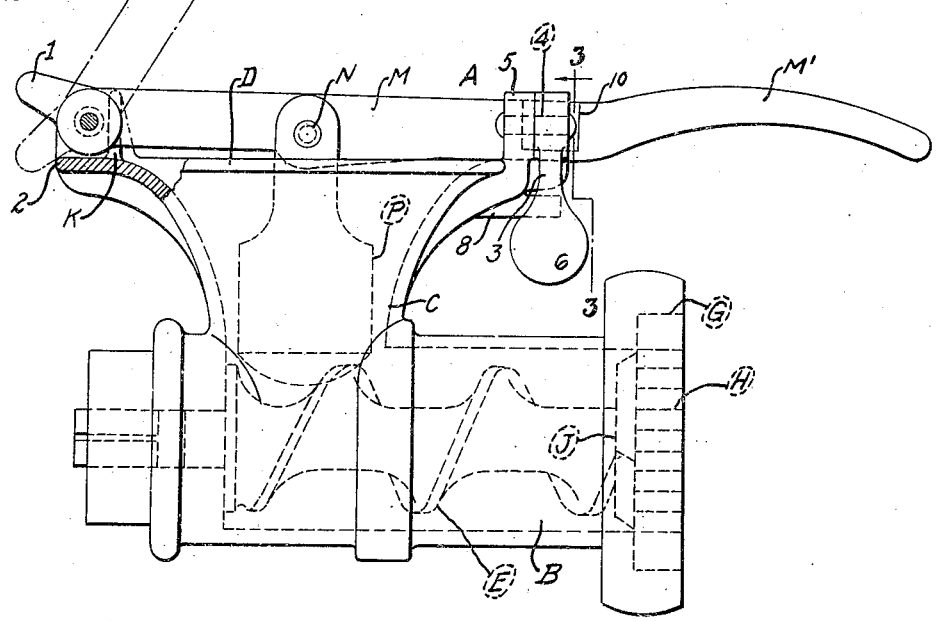
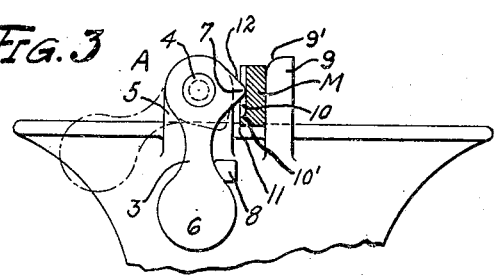
INVENTOR
A. RUBIN
By J.S.Cook
ATTORNEY Patented Apr. 19, 1932

1,854,227

UNITED STATES PATENT OFFICE

ADOLPH RUBIN, OF ST. LOUIS, MISSOURI, ASSIGNOR TO HUSSMANN-LIGONIER COMPANY, OF ST. LOUIS, MISSOURI, A CORPORATION OF DELAWARE

ATTACHMENT FOR FOOD CHOPPERS

Application filed May 2, 1930. Serial No. 449,196.

This invention relates generally to food choppers and more particularly to food choppers provided with lever feeding devices for feeding the food to be chopped into the food choppers, the predominant object of the invention being to provide a food chopper of the latter type with means for locking the lever feed in its lowered or depressed position.

Prior to this invention food choppers have been provided with lever feeding devices which were intended to discourage and prevent the use of the hands in feeding food to the food choppers. These feeding devices were adopted because of the frequent injury to the hands of operators of the food choppers resulting from the fingers coming into contact with the feed worm of the choppers. The lever feeding devices referred to have greatly reduced the number of injuries suffered by operators of food choppers, but a great number of such injuries still occur, these injuries being suffered by careless operators of food choppers and by children and other persons whose curiosity or carelessness leads them to raise the lever feeding devices and extend their fingers into the food choppers when same are in motion.

In view of the foregoing, I have devised the attachment for food choppers disclosed herein which, briefly stated, provides means for locking the lever feeding devices in a lowered or depressed position. When the lever feeding devices are in the lowered or depressed position referred to introduction of the fingers into the food choppers is absolutely prevented and by providing the locking device, the operation of which will not be familiar to persons other than those authorized to operate the food choppers, the likelihood that the lever feeding devices will be elevated by unauthorized persons is very greatly reduced. Also with respect to the authorized operator of a food chopper, the fact that an additional operation must be performed to raise the lever feeding device will prevent him from unconsciously or carelessly raising the lever feeding device when safety demands that said lever feeding device should remain in its lowered position.

An additional advantage resulting from the use of my improved attachment resides in the fact that the levers of the feeding devices constitute natural handles for carrying the food choppers when they are detached from their supports. Heretofore when the levers were not provided with locking means and hence were freely movable about their pivots, the food choppers would swing sharply downward when the levers were used as handles in picking the food choppers up and as a result the levers were frequently torn from the grasp of the persons carrying the food choppers permitting said food choppers to fall heavily to the floor. In this manner, the food choppers were frequently injured and in a number of cases the food choppers struck the feet of the persons attempting to carry same whereby said persons were injured.

By providing the food choppers with my improved locking means the food chopper is prevented from swinging away from the lever of the feeding device when the lever thereof is employed as a handle, whereby the accidents referred to are prevented.

Figure 1 is a plan view of a food chopper constructed in accordance with this invention.

Figure 2 is a side elevation of the food chopper illustrated in Figure 1, with a portion thereof shown in section.

Figure 3 is a fragmentary section on line 3—3 of Figure 2.

In the drawings, wherein is shown for the purpose of illustration, merely, one embodiment of the invention, A designates the food chopper generally, said food chopper comprising a housing having a grinding or chopping compartment B, a neck portion C, and a food receiving hopper portion D. The housing illustrated in the drawings is the housing which usually forms a part of a chopping machine of the type disclosed herein, and for that reason it will not be necessary to describe same in detail. Arranged in the grinding compartment B of the housing is a worm E, said worm being supported by suitable bearings so that it may rotate within said compartment. The worm E is connected to any suitable driving means, such as an electric motor (not shown). Located at the discharge end of the grinding compartment B of the housing of the machine is the usual disk G provided with a plurality of apertures H, and interposed between said disk G and an end of the worm E is a cutting device J.

In the use of the machine briefly described the meat or other food to be chopped is placed in the hopper D and is fed from there into and through the neck portion C of the housing. The matter being chopped passes from the neck portion C of the housing into the grinding compartment B, wherein said matter is forced toward the discharge end of said compartment B by the worm E. The matter being chopped is then forced through the apertures H in the disk G whereby said matter is divided into a plurality of individual bodies, each of which is periodically severed by the cutting device J which rotates with the worm E. The foregoing is a very brief description of the chopping machine and its operation but as this machine and its operation are well known, it is not believed to be necessary to describe same further.

Referring now to the mechanism for feeding the meat or other matter into the chopping machine, the hopper D of the housing is provided with a pair of ears K which are separated slightly from each other, as shown in Figure 1. The ears K are provided with suitable webs to give sufficient strength thereto so they may withstand the usage to which they are subjected. Hingedly secured to the ears K is a lever M, and pivotally secured to said lever at N is a plunger P, said plunger being substantially the same diameter as the interior of the neck portion of the machine housing. At its forward end the lever M is shaped to provide a grip M', and at the rearmost end of said lever a lug 1 is formed thereon. The lever M is capable of being swung to a position where it is parallel with and rests upon the upper edge of the hopper D of the housing of the machine, in which position the plunger P will extend downwardly into the neck portion C of said housing as shown in Figure 2. Also the lever M may be swung upwardly about its pivot to withdraw the plunger P from the neck portion of the machine.

It is undesirable that the lever M be capable of remaining in an elevated position, for if this were possible careless operators might move the lever to the elevated, inoperative, position and feed the matter being chopped into the machine by hand. I have, therefore, provided the lever M with the lug 1, already referred to, which is so shaped and arranged that when the lever is elevated to the approximate position illustrated by dotted lines in Figure 2, the lug will contact with the extension 2 of the housing and thereby arrest further upward and rearward movement of the lever. It is plain, therefore, that the lever M may not be moved to an inoperative position and that if said lever is moved to the limit of its upward movement and is released when in such position gravity will cause said lever to fall to its lowered or depressed position where the plunger P will serve as a guard to prevent access to the feed worm of the machine.

In the use of the feeding mechanism just described, the meat or other food matter to be chopped is placed in the hopper D and in the upper portion of the neck portion C of the machine housing. The lever M is then drawn downwardly so as to cause the plunger P to move downwardly in the neck portion of the housing, and because the plunger is approximately the same diameter as the inside of the neck portion of the housing all of the food matter therein will be forced downwardly into the grinding compartment of the machine.

Referring to the improved means for locking the lever M in a lowered or depressed position, 3 designates an element which is pivoted at 4 to an upstanding ear 5 formed on the hopper portion of the machine housing at the forward portion thereof. The element 3 includes a weighted lower end portion 6 which serves to maintain the element in a perpendicular position, and said element 3 also includes a laterally extended nose portion 7. Extended outwardly from the hopper portion of the machine housing is a stop or abutment 8 (Figure 3) which serves to limit pivotal movement of the element 3 to the right in Figure 3, and 9 designates an upstanding lug formed on the hopper portion of the machine housing which is arranged in laterally spaced relation with respect to the ear 5 and serves as a guide and backing element for the lever M. The lever M is provided with a depression 10 which extends transversely with respect to said lever and at the end of said depression which is the lower end thereof when the lever M is in its lowered position said depression is provided with a curved face 10'.

It is obvious that when the lever M is in its lowered position and the element 3 occupies the position in which it is shown by full lines most clearly in Figure 3, the lever M may be elevated only until the curved face 10' of the depression 10 formed in the lever contacts with the under side of the nose portion 7 of said element 3. Any attempted additional upward movement of the lever after such contact between the face 10' and the nose portion 7 will be prevented due to the fact that the stop or abutment 8 prevents pivotal movement of the element 3 in a direction which would permit upward movement of the nose portion 7, hence, said nose portion 7 will absolutely prevent further upward movement of the lever. If, however, an authorized person wishes to move the lever M to its elevated position he may grasp the grip M' of said lever and move the element 3 to the position in which same is shown by dotted lines in Figure 3 by moving one of his fingers against the portion 6 of said element. This movement results in the nose portion 7 of the element 3 being swung downwardly in an arc of a circle out of the path of travel of the curved face 10′, whereupon the lever M may be moved upwardly without hinderance from said nose portion. When the lever M moves downwardly from an elevated position, either by gravity or when the operator moves said lever downwardly, the edge 11 of the lever M will contact with the inclined top face 12 of the nose portion 7 in a manner to swing the element 3 on its pivot whereby the nose portion will be moved out of the path of downward travel of the lever. The lever is thereby permitted to move to its lowered position after which the weighted lower end of the element will move downwardly to cause said element to assume a perpendicular position whereupon the nose portion of said element will swing into the depression 10 in the lever M to again lock the lever in its lowered position.

It will be noted that the upstanding lug 9 prevents the arm M from moving away from the nose portion 7 of the element 3 in a lateral direction, and also this lug is provided with a curved face 9′ which guides the arm M to its proper position with respect to the nose portion of the element 3.

I claim:

1. In combination with a food chopping machine provided with a feeding mechanism including a pivoted operating lever, a locking device for automatically locking said lever in its lowered position, said locking device comprising a pivotally supported element provided with a nose portion and said lever being provided with a depression into which said nose portion is extended, and a face at the lower end of said depression adapted to be engaged by said nose portion to prevent free upward movement of said lever.

2. In combination with a food chopping machine provided with a feeding mechanism including a pivoted operating lever, a locking device for locking said lever in its lowered position, said locking device comprising a pivotally supported element provided with a nose portion and said lever being provided with a depression into which said nose portion is extended, a face at the lower end of said depression adapted to be engaged by said nose portion to prevent free upward movement of said lever, a stop for limiting pivotal movement of said pivoted element in one direction, and a lug for guiding and providing backing for said lever at a point adjacent to said pivoted lever.

In testimony that I claim the foregoing I hereunto affix my signature.

ADOLPH RUBIN.